Dec. 13, 1932.  H. R. HUNT  1,890,730
SNOW REMOVING DEVICE
Filed May 5, 1932  4 Sheets-Sheet 1
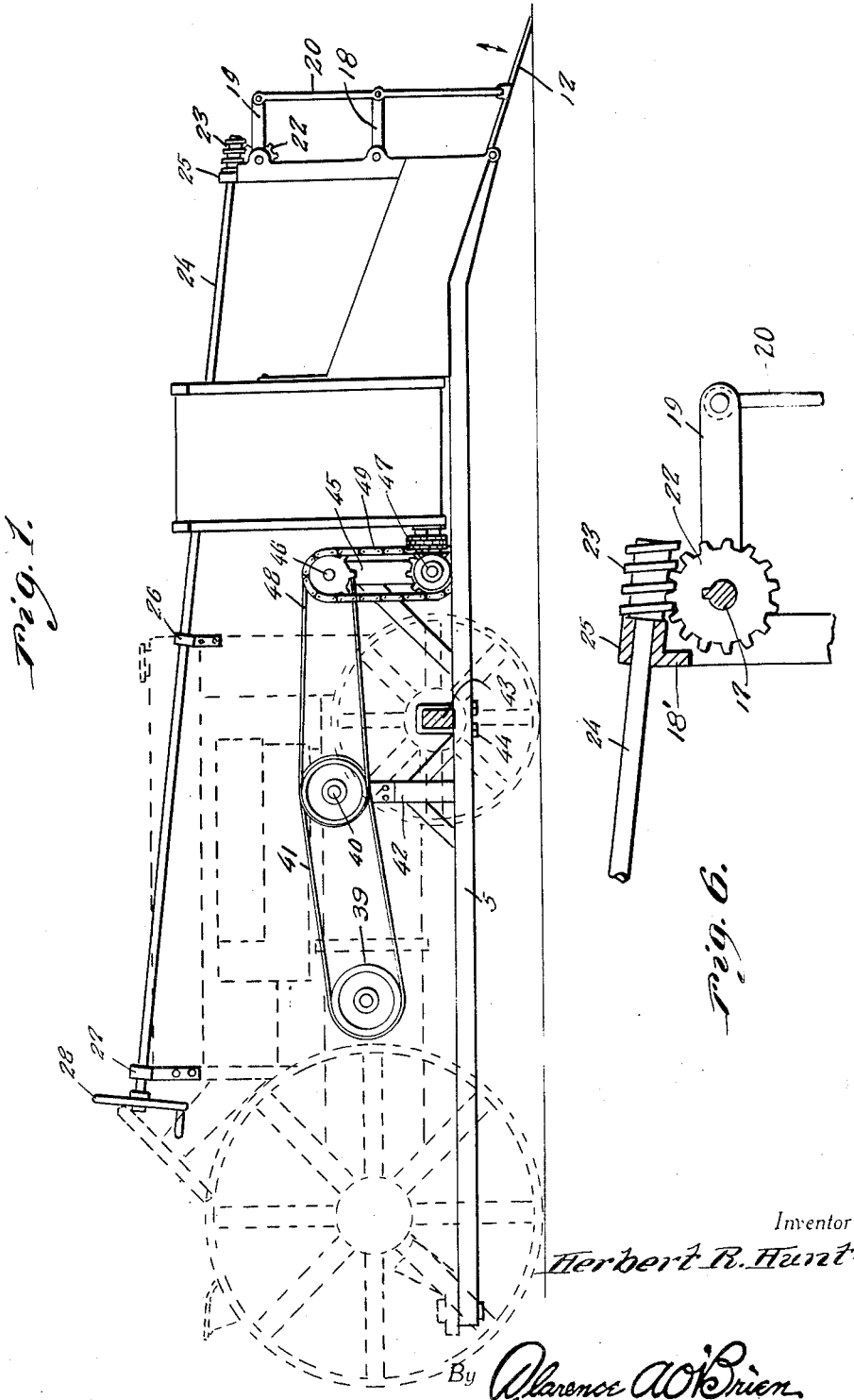
Inventor
Herbert R. Hunt
By Clarence A. O'Brien
Attorney

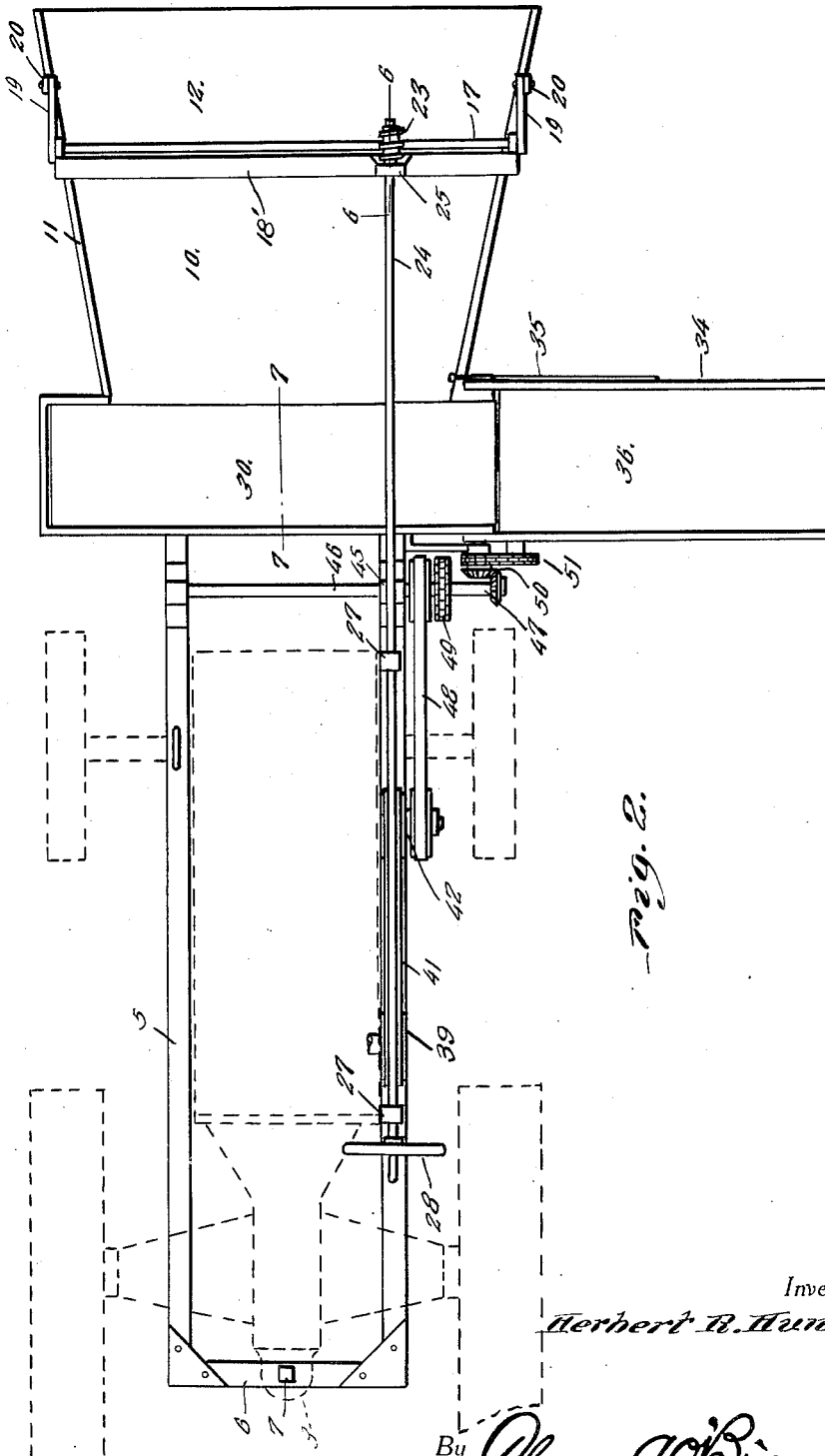

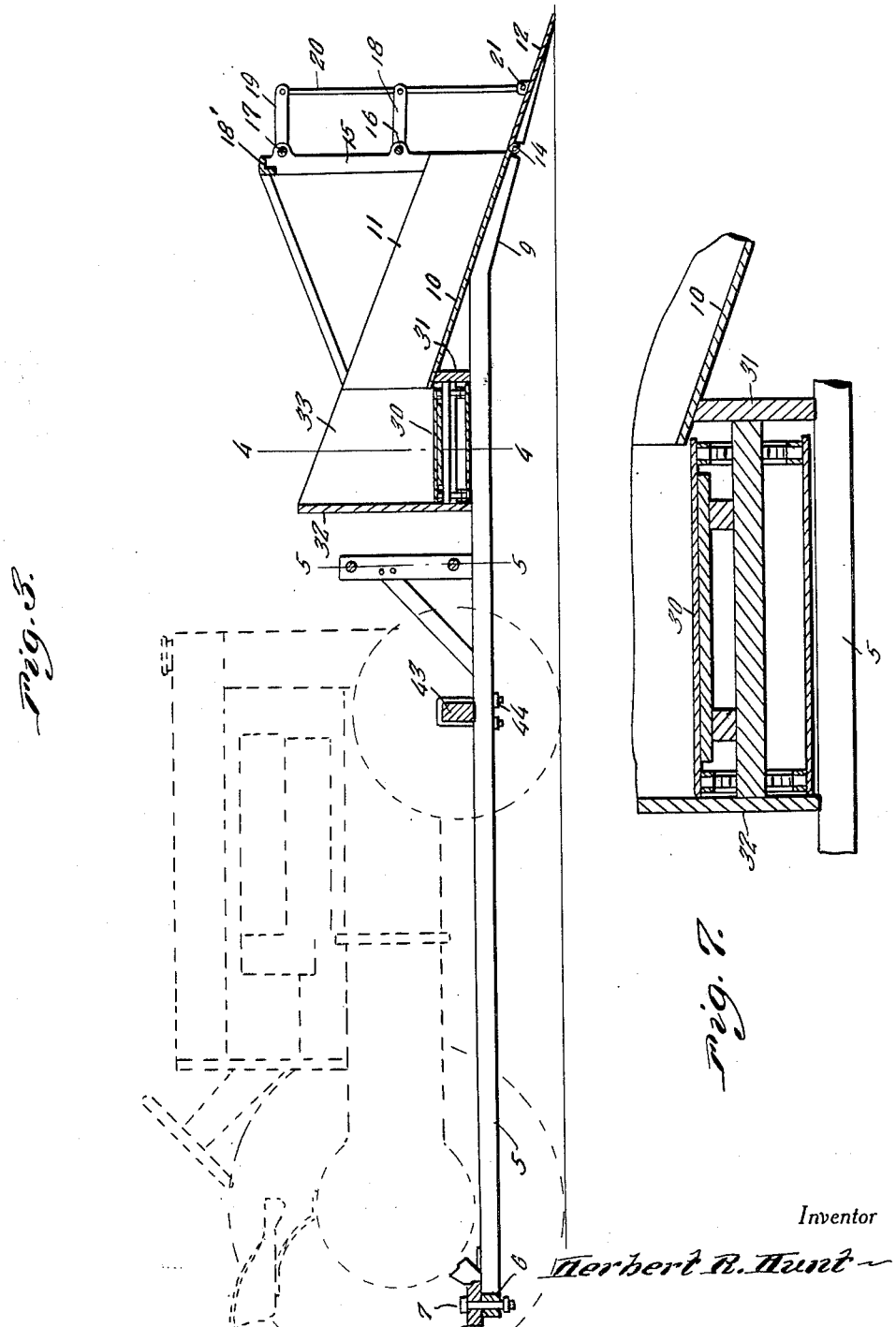

Dec. 13, 1932.  H. R. HUNT  1,890,730
SNOW REMOVING DEVICE
Filed May 5, 1932   4 Sheets-Sheet 4
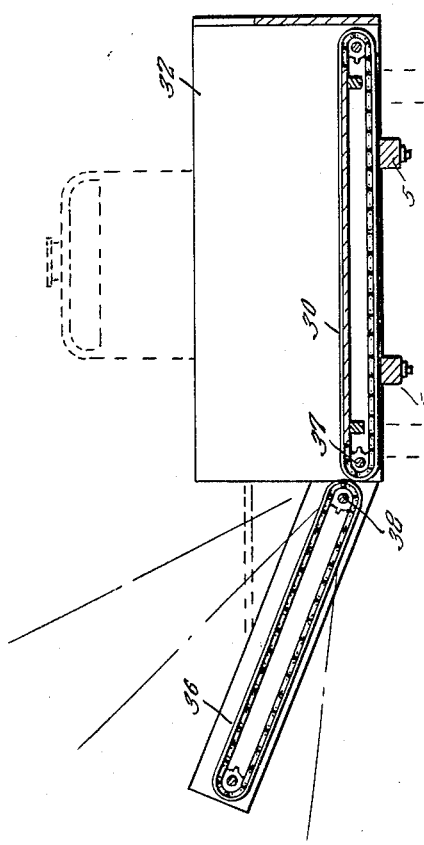
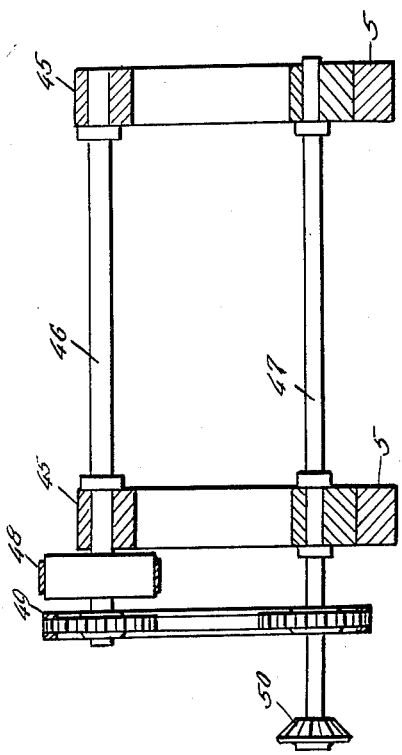
Inventor
Herbert R. Hunt
By Clarence A. O'Brien
Attorney Patented Dec. 13, 1932

1,890,730

UNITED STATES PATENT OFFICE

HERBERT R. HUNT, OF COTTONWOOD, SOUTH DAKOTA

SNOW REMOVING DEVICE

Application filed May 5, 1932. Serial No. 609,523.

The present invention relates to improvements in snow removing devices and has for its prime object to provide a device for this nature in the form of an attachment for a tractor and including means whereby snow may be picked up in front of the tractor and conveyed laterally therefrom.

Another very important object of the invention resides in the provision of a snow removing device in the nature of an attachment which is comparatively simple in construcion, strong and durable, easy to manipulate, thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the device embodying the features of my invention.

Figure 2 is a top plan view thereof.

Figure 3 is a vertical longitudinal section therethrough.

Figure 4 is a vertical transverse section taken substantially on the line 4—4 of Figure 3.

Figure 5 is another vertical transverse section taken substantially on the line 5—5 of Figure 3.

Figure 6 is a detail section taken substantially on the line 6—6 of Figure 2, and Figure 7 is a fragmentary longitudinal section taken substantially on the line 7—7 of Figure 2.

Referring to the drawings in detail it will be seen that numerals 5 denote spaced parallel co-extensive longitudinally extending frame bars connected at their rear ends by a cross frame bar 6 the center of which is attached as at 7 to the draw bar 8 of the tractor denoted in dotted lines in the drawings. The forward ends of the bars 6 having forwardly and downwardly inclined extensions 9.

A scoop comprises an inclined bottom 10 with upstanding side walls 11 which converge rearwardly toward each other. The bottom 10 is secured on the end portions 9. A scraper plate 12 is hingedly connected as at 14 with the forward edge of the bottom 10. Bars 15 rise from the side walls 11 at their front ends and have journalled thereacross shafts 16 and 17. A cross bar 18' is fixed to the upper ends of the bars 15. Arms 18 project forwardly from the shaft 16 while arms 19 project forwardly from the shaft 17. Link rods 20 are pivotally engaged with the forward ends of the arms 18 and 19 and with intermediate portions of the sides of the plate 12 as is indicated at 21. A worm gear 22 on the shaft 17 meshes with a worm 23 on a shaft 24 journalled through a riser 25 on the bar 18' and through brackets 26 and 27 on the tractor and a hand wheel 28 is provided at the rear end of the shaft 24 and by turning the hand wheel 28 the scraper blade or plate 12 may be swung upwardly or downwardly.

A transverse endless conveyor 30 is mounted in a frame comprising a front plate 31 rising from the bars 5 and terminating under the rear end of the bottom 10, a rear wall 32 rising from the bars 5 and terminating above the walls 11, and an end wall 33 at the left hand end of the conveyor. A conveyor frame 34 is mounted on the right hand end of the first mentioned conveyor frame and inclines upwardly and laterally therefrom being braced as at 35 and having an endless conveyor 36 mounted therein. A shaft 37 forms parts of the endless conveyor 30 and a shaft 38 forms part of the endless conveyor 36. Numeral 39 denotes the usual power take off of the tractor which is operatively connected with a shaft 40 by belt and pulley means 41. The shaft 40 is mounted in a riser 42 on the right hand bar 5 to the rear of the front axle 43 to which these bars 5 are attached by U-bolts 44. Risers 45 are on the bars 5 to the front of the axle 43 and to the rear of the endless conveyors and have journalled therein shafts 46 and 47. The shaft 46 is operatively connected with the shaft 40 by a belt and pulley mechanism 48. A chain and sprocket mechanism 49 connects the shaft 46 with the shaft 47. Bevel gears 50 connect the shaft 47 with the shaft 37 and chain and sprocket mechanism 51 connect the shaft 37 with the shaft 38.

It is thought that the operation of this attachment with the tractor will be quite self apparent without a more detailed description of the parts. It will be readily apparent that when the tractor moves forwardly and the endless conveyors are in operation snow will be scooped up in ahead of the tractor and delivered to the endless conveyors to be dumped well to one side of the tractor.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A snow plow attachment for a vehicle comprising a frame, means for attaching the frame to a vehicle with the front part of the frame extending in front of the vehicle, a downwardly and forwardly sloping trough supported at the front end of the frame, a plate having its rear edge hinged to the front edge of the bottom part of the trough, uprights having their lower portions connected with the front of the trough, a pair of shafts journalled in the upright and extending horizontally, arms connected with each shaft, vertically arranged rods supported by the outer ends of the said arms, means for connecting the lower ends of said rods to the said plate, a rearwardly extending rod, and worm gearing connecting the front end thereof with one of the shafts.

In testimony whereof I affix my signature.

HERBERT R. HUNT.